(12) United States Patent
Jeon et al.

(10) Patent No.: US 11,638,319 B2
(45) Date of Patent: Apr. 25, 2023

(54) HANDLING RADIO LINK FAILURE IN CELLULAR MESH NETWORKS

(71) Applicant: Samsung Electronics Co., Ltd., Suwon-si (KR)

(72) Inventors: Jeongho Jeon, San Jose, CA (US); Vishnu Vardhan Ratnam, Plano, TX (US); Joonyoung Cho, Portland, OR (US)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 16/788,011

(22) Filed: Feb. 11, 2020

(65) Prior Publication Data

US 2020/0260519 A1    Aug. 13, 2020

Related U.S. Application Data

(60) Provisional application No. 62/804,502, filed on Feb. 12, 2019.

(51) Int. Cl.
*H04W 76/19* (2018.01)
*H04W 40/02* (2009.01)

(52) U.S. Cl.
CPC ........... *H04W 76/19* (2018.02); *H04W 40/02* (2013.01)

(58) Field of Classification Search
CPC ..... H04W 76/19; H04W 40/02; H04W 92/20; H04W 36/305
See application file for complete search history.

(56) References Cited

U.S. PATENT DOCUMENTS

| | | | |
|---|---|---|---|
| 9,432,249 B2 | 8/2016 | Fujishiro | |
| 9,509,594 B2* | 11/2016 | Velde | H04L 45/28 |
| 10,136,359 B2 | 11/2018 | Hampel et al. | |
| 10,624,146 B2* | 4/2020 | Ma | H04W 76/18 |
| 2006/0063544 A1* | 3/2006 | Zhao | H04W 76/10 |
| | | | 455/510 |
| 2009/0213730 A1* | 8/2009 | Zeng | H04W 24/04 |
| | | | 370/217 |

(Continued)

FOREIGN PATENT DOCUMENTS

| | | | | |
|---|---|---|---|---|
| KR | 10-2018-0022699 A | 3/2018 | | |
| WO | WO-2020059633 A1 * | 3/2020 | ............ | H04W 24/04 |

OTHER PUBLICATIONS

Huawei, HiSilicon; "On backhaul link radio link failure handling for IAB"; 3GPP TSG RAN WG1 Ad-Hoc Meeting 1901; R1-1901264 (Year: 2019).*

(Continued)

*Primary Examiner* — Parth Patel

(57) ABSTRACT

Methods and apparatuses for handling radio link failure (RLF) in a wireless communication network. A method for operating a base station (BS) includes detecting occurrence of a RLF on a backhaul link with a parent BS of the BS and transmitting to a wireless communication device connected to the BS a first notification of the RLF indicating to hold data to be transmitted from the wireless communication device to the BS. The method further includes determining whether connection to a core network entity in the wireless communication network can be reestablished and transmitting to the wireless communication device a second notification based on the reestablishment determination.

25 Claims, 13 Drawing Sheets

(56) References Cited

U.S. PATENT DOCUMENTS

| | | | | |
|---|---|---|---|---|
| 2011/0242970 A1* | 10/2011 | Prakash | H04W 76/38 | 370/225 |
| 2012/0236707 A1* | 9/2012 | Larsson | H04W 76/19 | 370/217 |
| 2012/0263035 A1* | 10/2012 | Nakanishi | H04L 45/28 | 370/225 |
| 2012/0314567 A1* | 12/2012 | Seo | H04W 24/04 | 370/228 |
| 2012/0327801 A1* | 12/2012 | Seo | H04B 1/74 | 370/252 |
| 2013/0003534 A1* | 1/2013 | Henry | H04L 45/28 | 370/228 |
| 2013/0183960 A1* | 7/2013 | Olofsson | H04W 36/0066 | 455/423 |
| 2014/0080468 A1* | 3/2014 | Zhang | H04W 24/02 | 455/418 |
| 2014/0187236 A1* | 7/2014 | Chiang | H04W 24/04 | 455/423 |
| 2014/0307542 A1* | 10/2014 | Fujishiro | H04W 76/19 | 370/225 |
| 2015/0133122 A1* | 5/2015 | Chen | H04W 36/0085 | 455/436 |
| 2015/0156815 A1* | 6/2015 | Pang | H04L 45/48 | 370/338 |
| 2016/0021697 A1* | 1/2016 | Vargantwar | H04W 76/19 | 370/329 |
| 2017/0048775 A1* | 2/2017 | Kim | H04W 76/18 | |
| 2017/0171903 A1* | 6/2017 | Kubota | H04L 41/0672 | |
| 2018/0063731 A1* | 3/2018 | Ashrafi | H04B 10/1123 | |
| 2018/0192332 A1* | 7/2018 | Joshi | H04W 76/19 | |
| 2018/0242221 A1 | 8/2018 | Nagasaka et al. | | |
| 2018/0343567 A1* | 11/2018 | Ashrafi | H04L 67/10 | |
| 2018/0343698 A1* | 11/2018 | Mitsui | H04W 76/19 | |
| 2019/0394823 A1* | 12/2019 | Jo | H04W 76/11 | |
| 2019/0394825 A1* | 12/2019 | Byun | H04W 76/11 | |
| 2020/0022039 A1* | 1/2020 | Kadiri | H04W 88/023 | |
| 2020/0022054 A1* | 1/2020 | Hong | H04B 17/327 | |
| 2020/0045610 A1* | 2/2020 | Shih | H04W 40/248 | |
| 2020/0092784 A1* | 3/2020 | Hampel | H04B 7/15528 | |
| 2020/0260519 A1* | 8/2020 | Jeon | H04W 40/02 | |
| 2020/0281038 A1* | 9/2020 | Fujishiro | H04W 36/305 | |
| 2020/0351968 A1* | 11/2020 | Yilmaz | H04W 36/0069 | |
| 2021/0037438 A1* | 2/2021 | Uchiyama | H04W 40/22 | |
| 2021/0084506 A1* | 3/2021 | Kimba Dit Adamou | H04W 40/22 | |
| 2021/0195674 A1* | 6/2021 | Park | H04B 7/15557 | |
| 2021/0195675 A1* | 6/2021 | Park | H04W 76/18 | |
| 2021/0315040 A1* | 10/2021 | Wu | H04W 48/20 | |

OTHER PUBLICATIONS

"3rd Generation Partnership Project; Technical Specification Group Radio Access Network; NR; Study on Integrated Access and Backhaul; (Release 16)", 3GPP TR 38.874, V16.0.0, Dec. 2018, 111 pages.

International Search Report and Written Opinion of the International Searching Authority in connection with International Application No. PCT/KR2020/001969 dated May 25, 2020, 10 pages.

* cited by examiner

HANDLING RADIO LINK FAILURE IN CELLULAR MESH NETWORKS

CROSS-REFERENCE TO RELATED APPLICATIONS AND CLAIM OF PRIORITY

The present application claims priority to U.S. Provisional Patent Application No. 62/804,502, filed on Feb. 12, 2019. The content of the above-identified patent document is incorporated herein by reference.

TECHNICAL FIELD

The present application relates generally to wireless communication systems, more specifically, the present disclosure relates to handling radio link failure (RLF) in cellular or wireless mesh networks.

BACKGROUND

A communication system includes a downlink (DL) that conveys signals from transmission points such as base stations (BSs) to reception points such as user equipments (UEs) and an uplink (UL) that conveys signals from transmission points such as UEs to reception points such as BSs. Increasing the deployment density of BSs is a way to increase data throughputs, via spatial reuse of frequencies. In fact, such spatial reuse has been one of the main contributors for increase in system throughput since the early days of cellular communication. While improving spatial reuse, a dense BS deployment may be inevitable at millimeter wave (mm-wave) and terahertz (THz) frequencies to improve coverage, by compensating for the pathloss and blockage. However, the deployment locations and density of conventional BSs is limited by the availability of expensive fiber backhaul.

SUMMARY

The present disclosure relates handling of radio link failure in cellular or wireless mesh networks.

In one embodiment, a method for operating a base station (BS) in a wireless communication network is provided. The method includes detecting occurrence of a radio link failure (RLF) on a backhaul link with a parent BS of the BS and transmitting to a wireless communication device connected to the BS a first notification of the RLF indicating to hold data to be transmitted from the wireless communication device to the BS. The method further includes determining whether connection to a core network entity in the wireless communication network can be reestablished and transmitting to the wireless communication device a second notification based on the reestablishment determination.

In another embodiment, a BS in a wireless communication network is provided. The BS includes a processor configured to detect occurrence of an RLF on a backhaul link with a parent BS of the BS; and a transceiver operably connected to the processor. The transceiver is configured to transmit to a wireless communication device connected to the BS a first notification of the RLF indicating to hold data to be transmitted from the wireless communication device to the BS. The processor is further configured to determine whether connection to a core network entity in the wireless communication network can be reestablished. The transceiver is further configured to transmit to the wireless communication device a second notification based on the reestablishment determination.

In yet another embodiment, a wireless communication device in a wireless communication network is provided. The wireless communication device includes a transceiver configured to receive, from a base station (BS), a first notification indicating occurrence of an RLF on a backhaul link of the BS with a parent BS of the BS; and a processor operably connected to the transceiver. The processor is configured to determine, based on the first notification, to hold data to be transmitted by the wireless communication device to the BS. The transceiver is further configured to receive a second notification indicating whether the BS can reestablish connection to a core network entity in the wireless communication network.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
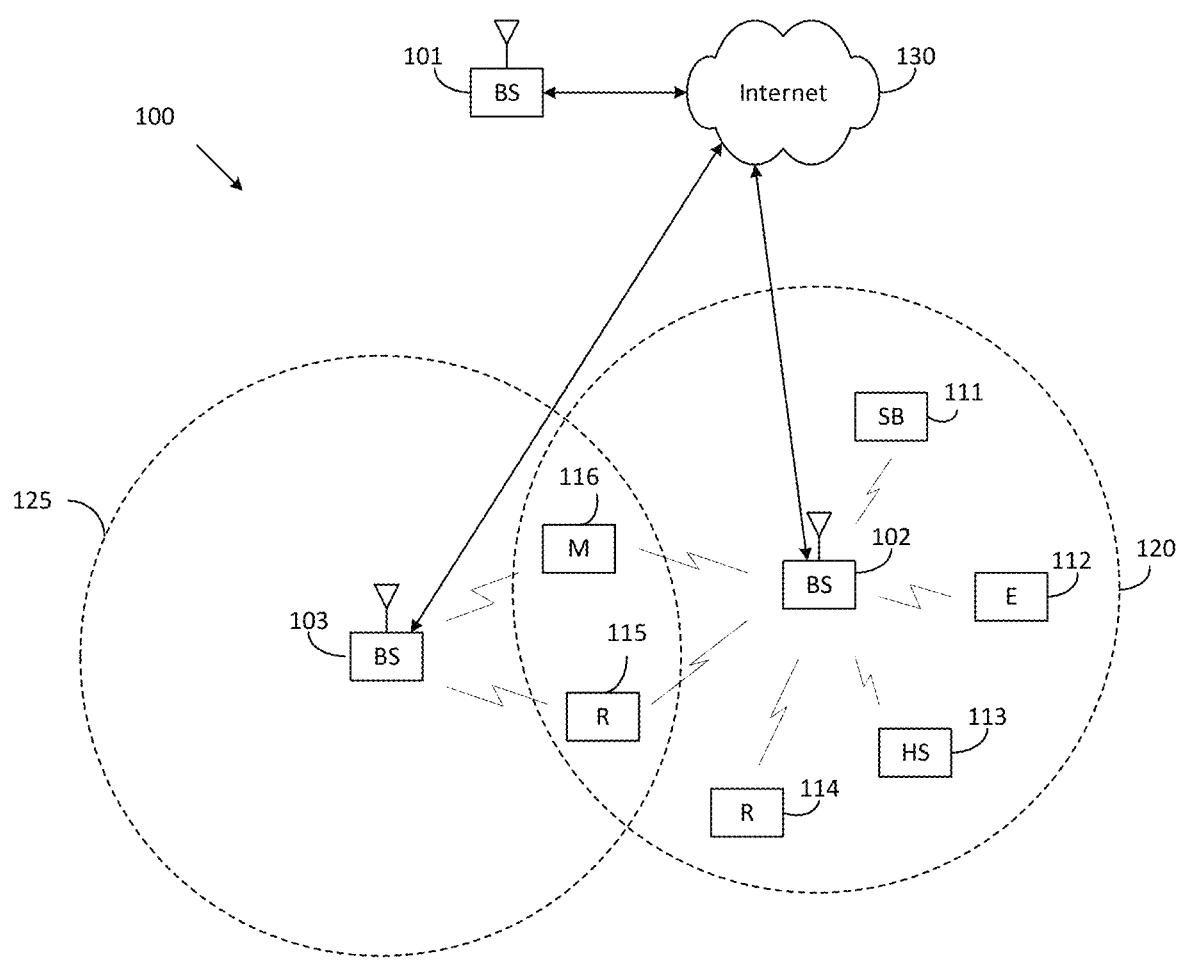
FIG. 1 illustrates an example wireless network according to embodiments of the present disclosure.
Figure 2:
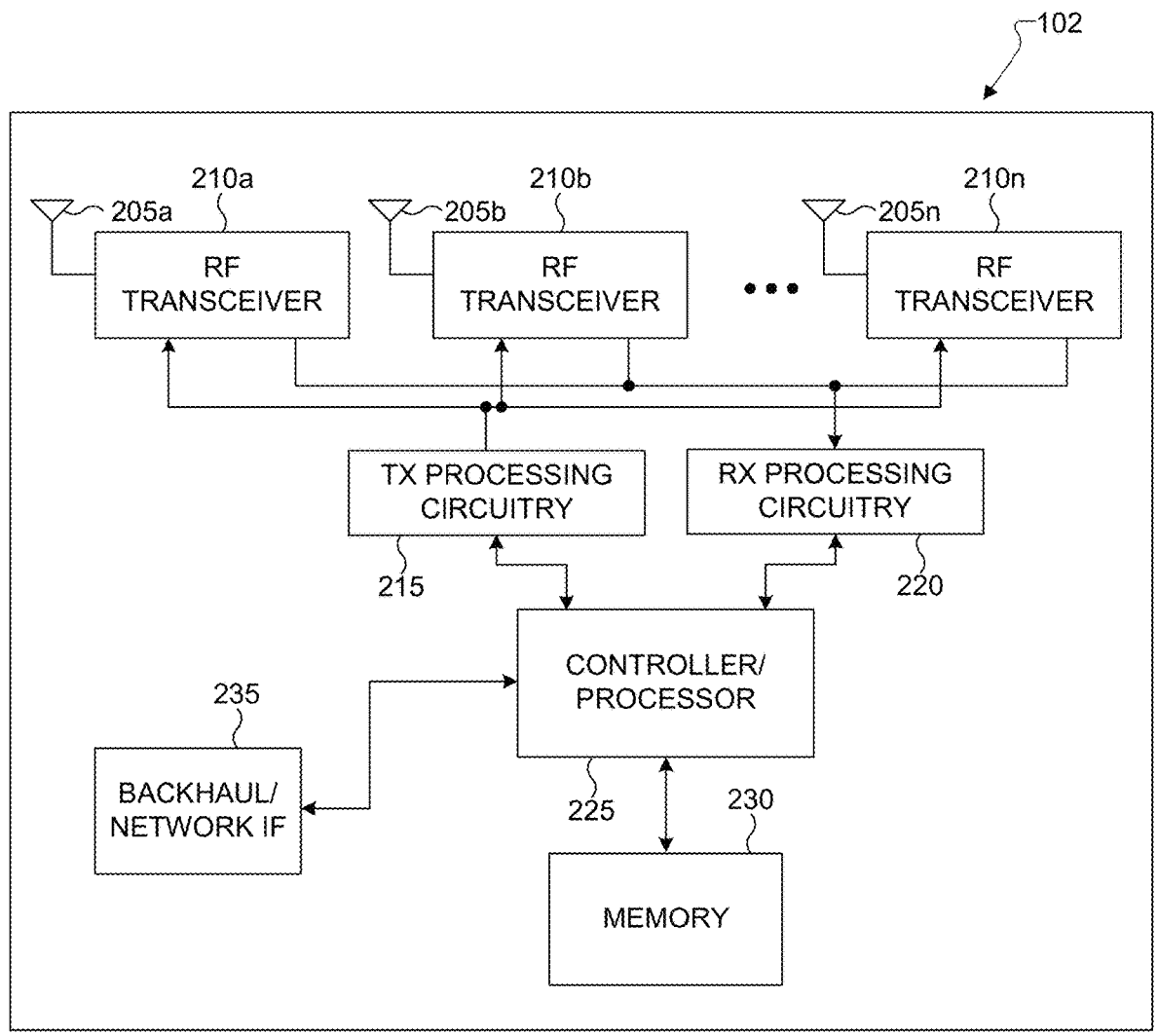
FIG. 2 illustrates an example gNB according to embodiments of the present disclosure.
Figure 3:
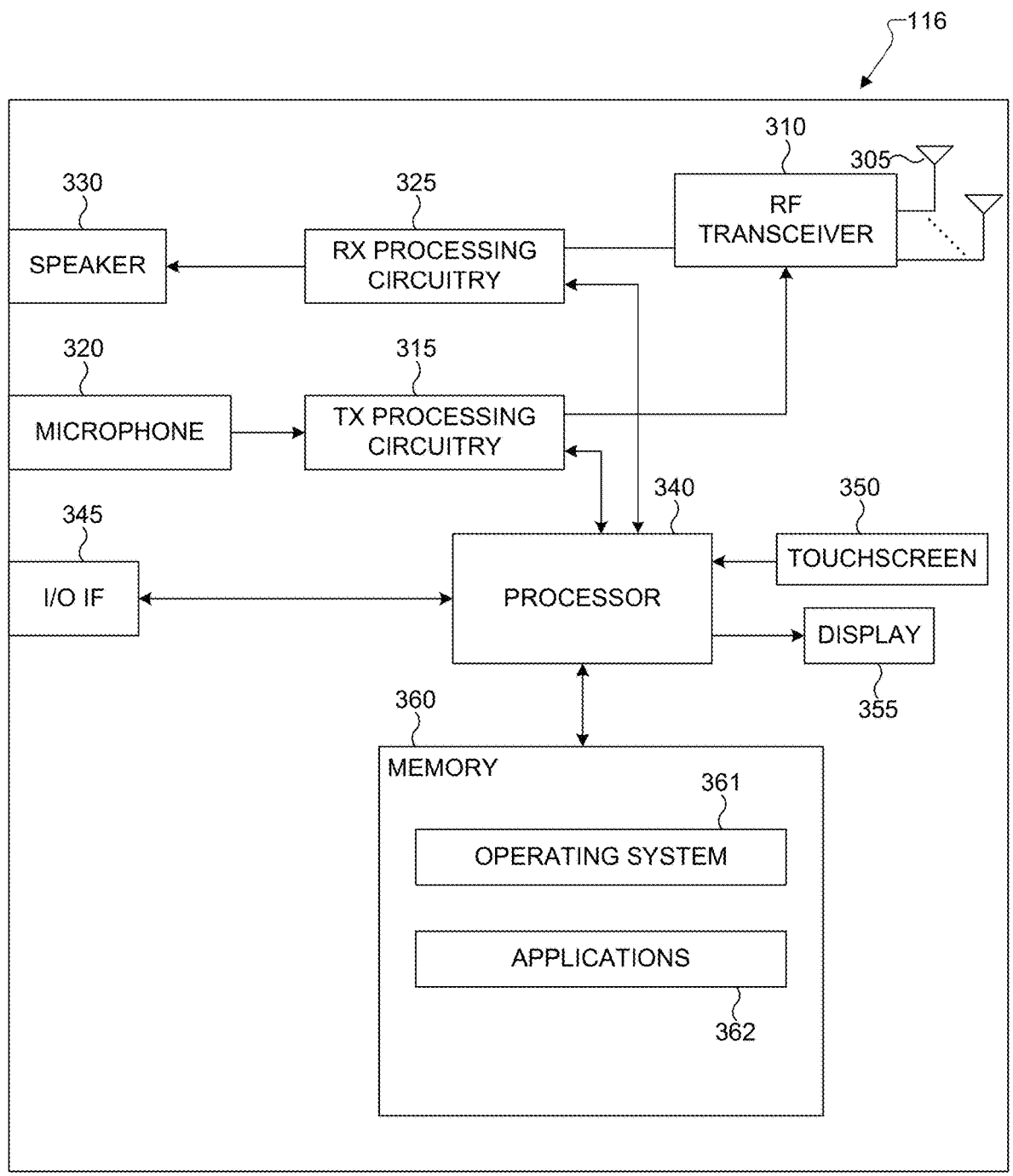
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "UE" can refer to any component such as mobile station, subscriber station, remote terminal, wireless terminal, receive point, or user device. For the sake of convenience, the term "UE" is used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for reception reliability for data and control information in an advanced wireless communication system. In certain embodiments, and one or more of the gNBs 101-103 includes circuitry, programming, or a combination thereof, for efficient neighbor discovery and wireless inter-connection for cellular mesh network.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a beyond 4G network or a post LTE system. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
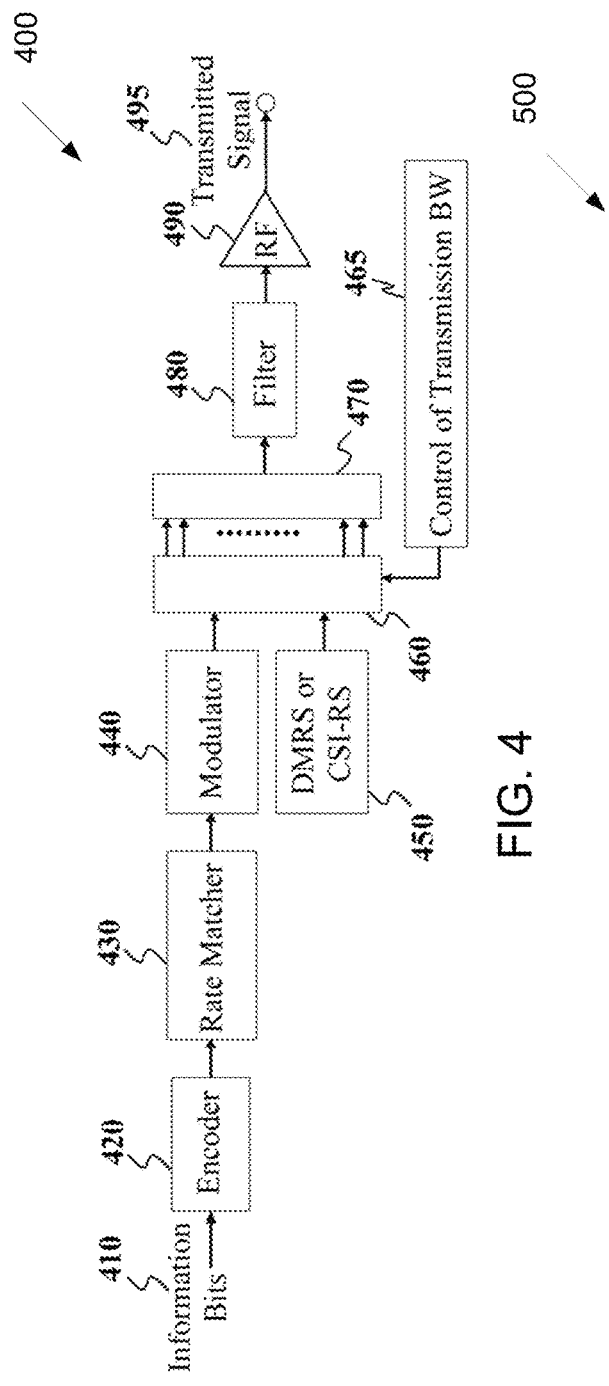
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping circuit 465, an inverse fast Fourier transform (IFFT) is performed by filter 470, a cyclic prefix (CP) is added by CP insertion circuit 480, and a resulting signal is filtered by filter 490 and transmitted by an radio frequency (RF) circuit 495.

Figure 5:
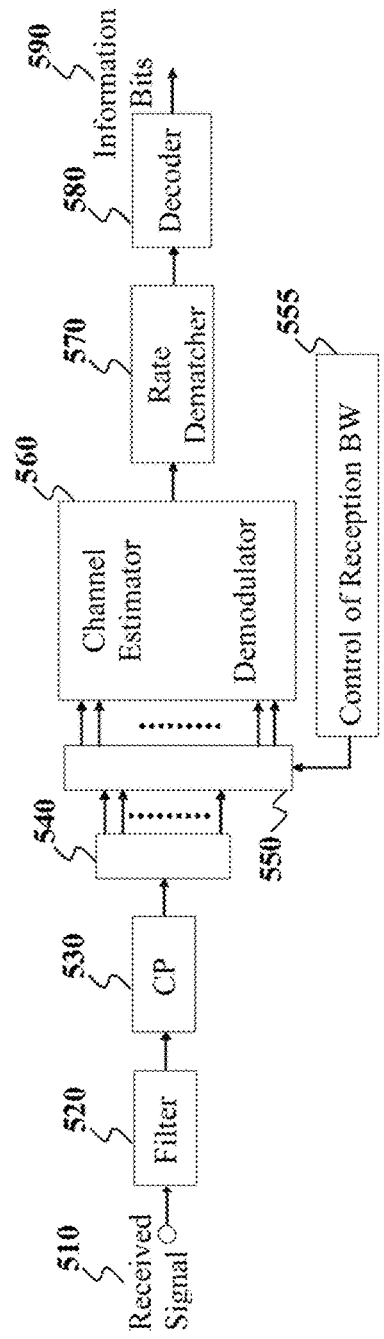
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal circuit removes a CP 530, a filter 540 applies a fast Fourier transform (FFT), SCs de-mapping circuit 550 de-maps SCs selected by BW selector circuit 555, received symbols are demodulated by a channel estimator and a demodulator circuit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
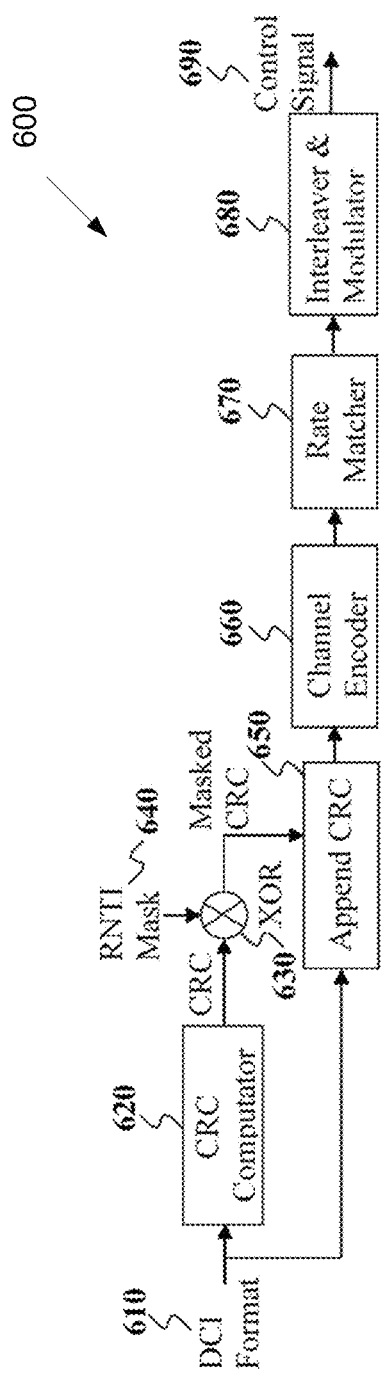
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation circuit 620, and the CRC is masked using an exclusive OR (XOR) operation circuit 630 between CRC bits and RNTI bits 640. The XOR operation is defined as XOR (0,0)=0, XOR (0,1)=1, XOR (1,0)=1, XOR (1,1)=0. The masked CRC bits are appended to DCI format information bits using a CRC append circuit 650. An encoder 660 performs channel coding (such as tail-biting convolutional coding or polar coding), followed by rate matching to allocated resources by rate matcher 670. Interleaving and modulation circuits 680 apply interleaving and modulation, such as QPSK, and the output control signal 690 is transmitted.

Figure 7:
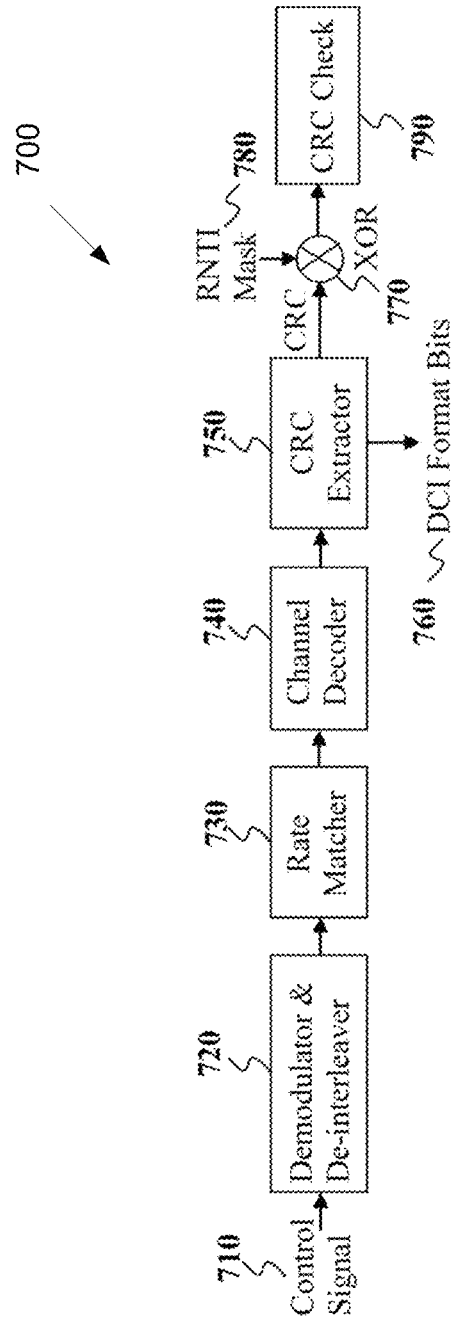
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by circuit 790. When the CRC check succeeds (check-sum is zero), the DCI format information bits are considered to be valid. When the CRC check does not succeed, the DCI format information bits are considered to be invalid.

Increasing the deployment density of BSs is a way to increase data throughputs, via spatial reuse of frequencies. In fact, such spatial reuse has been one of the main contributors for increase in system throughput since the early days of cellular communication. While improving spatial reuse, a dense BS deployment may be inevitable at millimeter wave (mm-wave) and terahertz (THz) frequencies to improve coverage, by compensating for the pathloss and blockage.

However, the deployment locations and density of conventional BSs is limited by the availability of expensive fiber backhaul.

Figure 8:
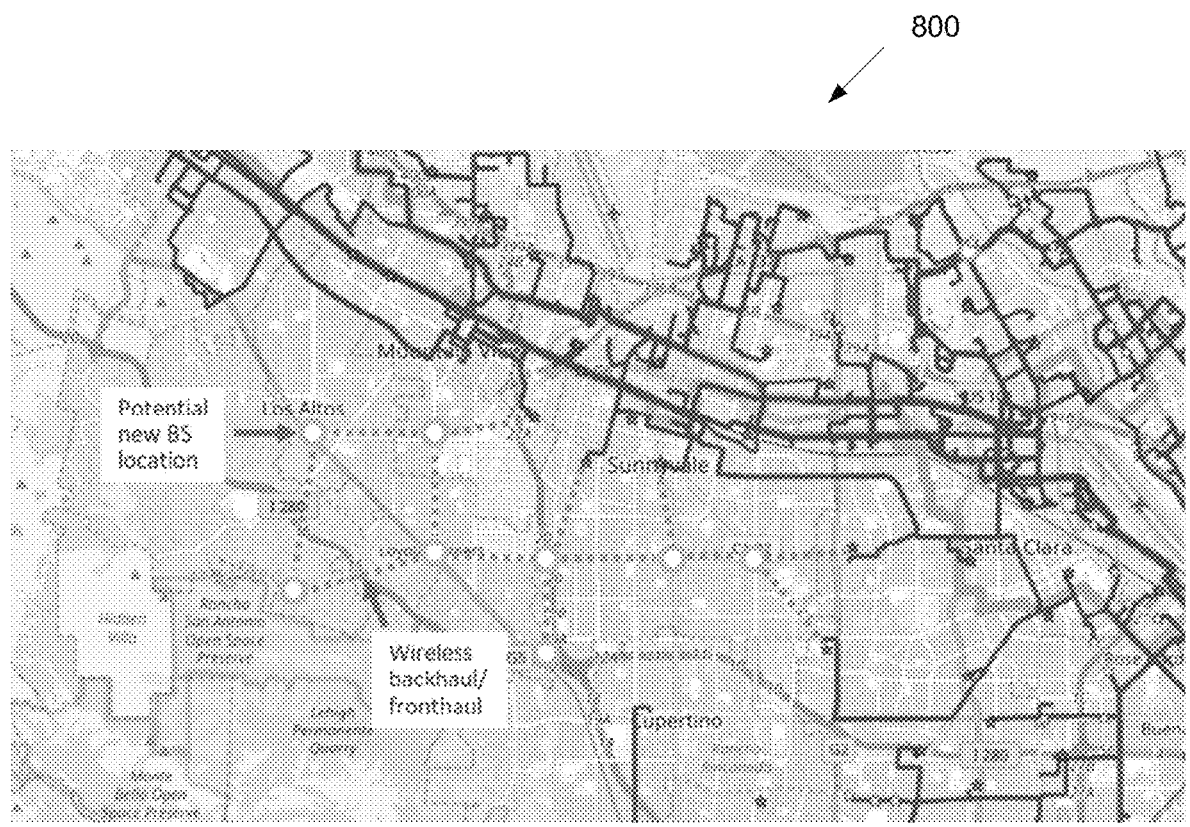
FIG. 8 illustrates an example fiber and BS deployment according to embodiments of the present disclosure.

FIG. 8 illustrates an example fiber and BS deployment 800 according to embodiments of the present disclosure. The embodiment of the fiber and BS deployment 800 illustrated in FIG. 8 is for illustration only. FIG. 8 does not limit the scope of the present disclosure to any particular implementation.

As an illustration, FIG. 8 shows a typical fiber and BS deployment in an urban area. An effective way to "unleash" the BS deployment from fiber and provide improved coverage and better deployment density without additional expensive fiber deployment, is by using wireless backhaul for the BSs. To be most effective, such BSs may be capable of establishing one or more backhaul paths to the fiber network, with each path encompassing one or more wireless links as illustrated in FIG. 8, i.e., multi-connectivity and multi-hop functionality can be supported. A deployed network with such capabilities is referred to as a wireless mesh network.

Figure 9:
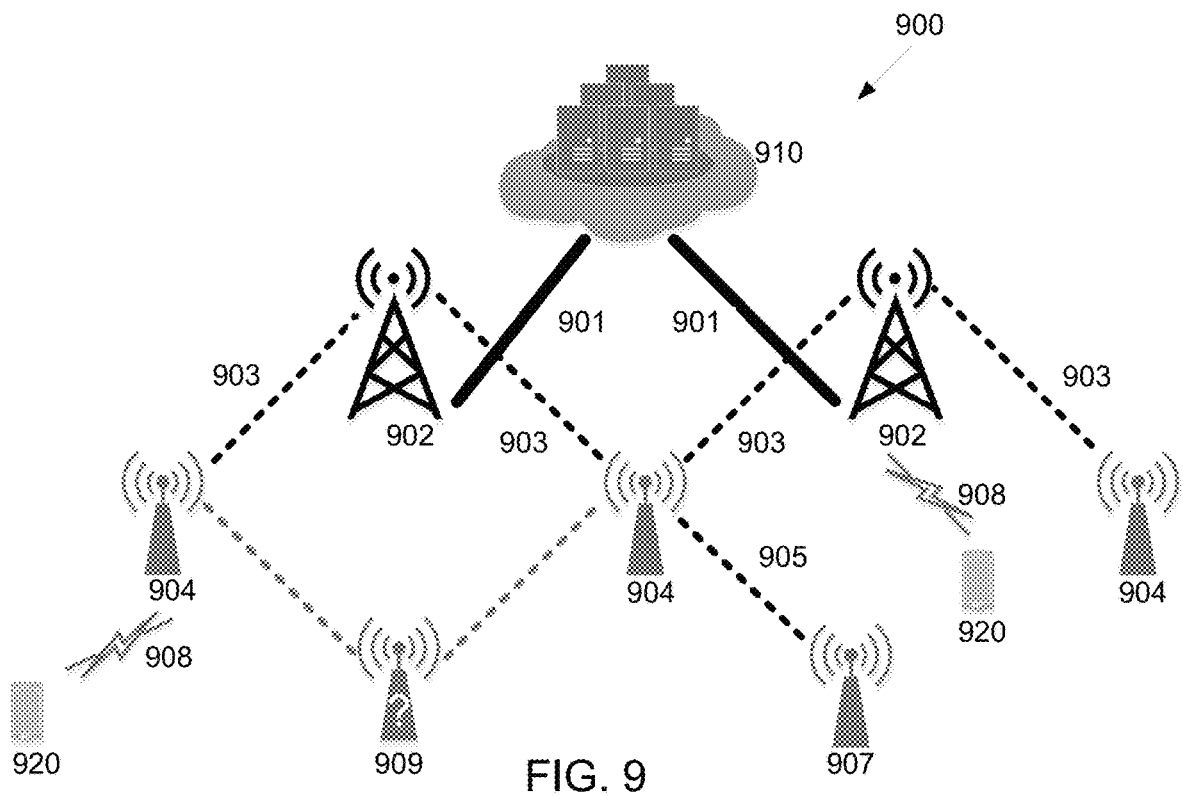
FIG. 9 illustrates an example multi-hop wireless backhaul mesh network according to embodiments of the present disclosure.

FIG. 9 illustrates an example multi-hop wireless backhaul mesh network 900 according to embodiments of the present disclosure. The embodiment of the multi-hop wireless backhaul mesh network 900 illustrated in FIG. 9 is for illustration only. FIG. 9 does not limit the scope of the present disclosure to any particular implementation.

An illustrative example of a multi-hop wireless mesh network 900 is provided in FIG. 9. The network 900 includes a plurality of BS 902, 904, 907, and 909, which may be examples of gNB 102, and a plurality of UEs 920, which may be examples of UE 116. Referring to FIG. 9, a gateway BS 902 may be connected to the core network 910 by a fiber/wired backhaul link 901. Similarly, a mesh BS 904 may be connected to a gateway BS 902 via a wireless interface 903, and a mesh BS 907 may be wirelessly connected to a mesh BS 904 via a wireless interface 905. A UE 920 can be connected either to a mesh BS or to a gateway BS via a wireless access link 908. The downlink backhaul traffic to a mesh BS 904 can be routed from the core network 910 to a gateway BS 902 through fiber/wired backhaul interface 901 and then transmitted to the BS 904 (e.g., mesh BS(s)) through the wireless interface 903.

The uplink backhaul traffic from the mesh BS 904 may be transmitted through the wireless interface 903 to the gateway BS 902 and then routed to the core network 910 by the fiber/wired backhaul interface 901. Similarly, the downlink backhaul traffic to the mesh BS 907 may be routed from the core network 910 to the gateway BS 902 via the wired interface 901, and then transmitted via the wireless interface 903 to the mesh BS 904 and then via wireless interface 905 to the mesh BS 907. The immediate previous hop BS that provides a mesh BS/UE connectivity to the core network is referred to as a parent BS.

The mesh BSs 904, 907 with already existing single hop (e.g., 903) or the multi-hop (e.g., 903-905) backhaul interface to the gateway BS 902 or the core network 910 is referred to as a connected mesh BS. Similarly, the mesh BS 909 that currently does not have a backhaul interface to the core network 910 is referred to as a new mesh BS. For an in-band operation, the BS-BS backhaul interfaces 903, 905, may re-use the same frequency resource as the BS-UE access links 908, while for out-of-band operation, both backhaul/fronthaul and access link may use different frequency resources. For centralized control case, the fronthaul/backhaul traffic routing decisions for the mesh network may be made by the gateway BS or another entity within the core network. For the decentralized control, each BS may make the fronthaul/backhaul traffic routing decisions by itself.

Figure 10:
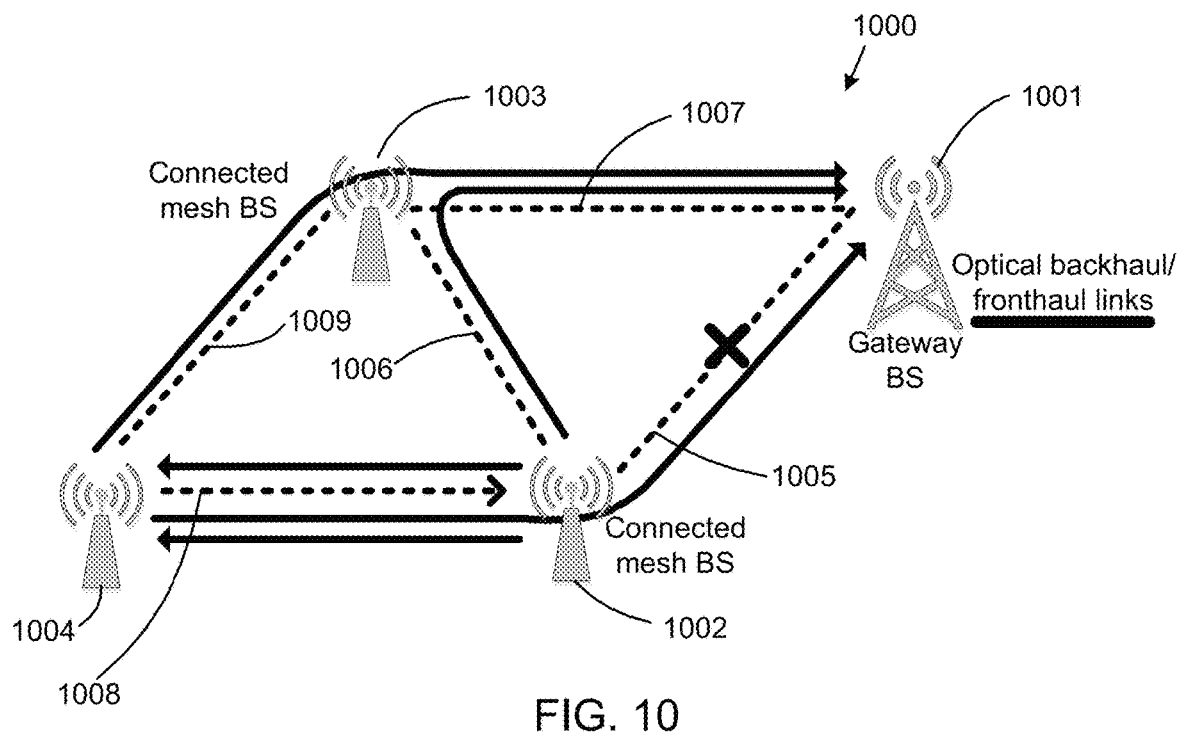
FIG. 10 illustrates an example for RLF handling on a wireless backhaul/fronthaul link in a wireless backhaul mesh network according to embodiments of the present disclosure.

FIG. 10 illustrates an example for RLF handling on a wireless backhaul/fronthaul link in a wireless backhaul mesh network 1000 according to embodiments of the present disclosure. For example, the wireless backhaul mesh network 1000 may be an example of one implementation of the wireless backhaul mesh network 900 in FIG. 9. The embodiment of the wireless backhaul mesh network 1000 illustrated in FIG. 10 is for illustration only. FIG. 10 does not limit the scope of the present disclosure to any particular implementation.

FIG. 10 illustrates a network with an RLF situation on a wireless mesh link 1005. As an example, a mesh BS 1004 has an original route on link 1005 towards a gateway BS 1001 through a mesh BS 1002. In this example, an RLF occurs on wireless mesh link 1005, which can be detected by a mesh BS 1002.

In an access link case, when RLF occurs, a UE searches for a new serving cell by itself and has no further chain effect. However, in the case of mesh links, embodiments of the present disclosure recognize that the RLF events need to be handled with more care as the RLF on the wireless mesh link 1005 also affects a child mesh BS 1004, which connects to the gateway BS 1001 through the mesh BS 1002 and the wireless mesh link 1005.

In various embodiments, the mesh BS 1002 experiencing RLF sends a TX hold message (on link 1008), which is also referred to as a soft RLF message in the embodiments of the present disclosure, to child mesh BS(s) 1004 and/or associated UE(s) of the mesh BS experiencing RLF, if, for example, the mesh BS 1002 evaluates the current RLF situation recoverable. Additionally, or alternatively, the mesh BS 1002 experiencing RLF tries to establish a new route to the gateway BS 1001, for example, via BS 1003 via links 1006 and 1007. In the meantime, while the mesh BS 1002 experiencing RLF tries to establish a new route, the child mesh BSs/UEs 1004, which received a TX hold message, may cease all or part of the transmissions to the parent mesh BS experiencing RLF for any granted transmissions or configured grant (i.e., grant-free) transmissions.

In one example, the ceased transmission may be only for data but not for the control messages or the ceased transmission can be for both. In one embodiment, a mesh BS 1002 with RLF may transmit a TX resume message (on link 1008), which is also referred to as a soft RLF revoke, upon recovery of the failed radio link or establishment of an alternate route. In one embodiment, the TX resume message may also include update route information.

In one example, a mesh BS 1002 establishes a new route to a gateway BS 1001, through a mesh BS 1003 via link 1006 and 1007. Upon receiving such updated route information contained in the TX resume message, a child mesh BS 1004 may evaluate the updated route and decide whether to stay with the current parent mesh BS 1002 or to initiate a path switching. In this example network, the mesh BS 1004 could directly connect to the mesh BS 1003 (on link 1009) instead of being connected through the mesh BS 1002. In such case, the mesh BS 1004 may switch a parent mesh BS to the BS 1003 from the BS 1002.

Figure 11:
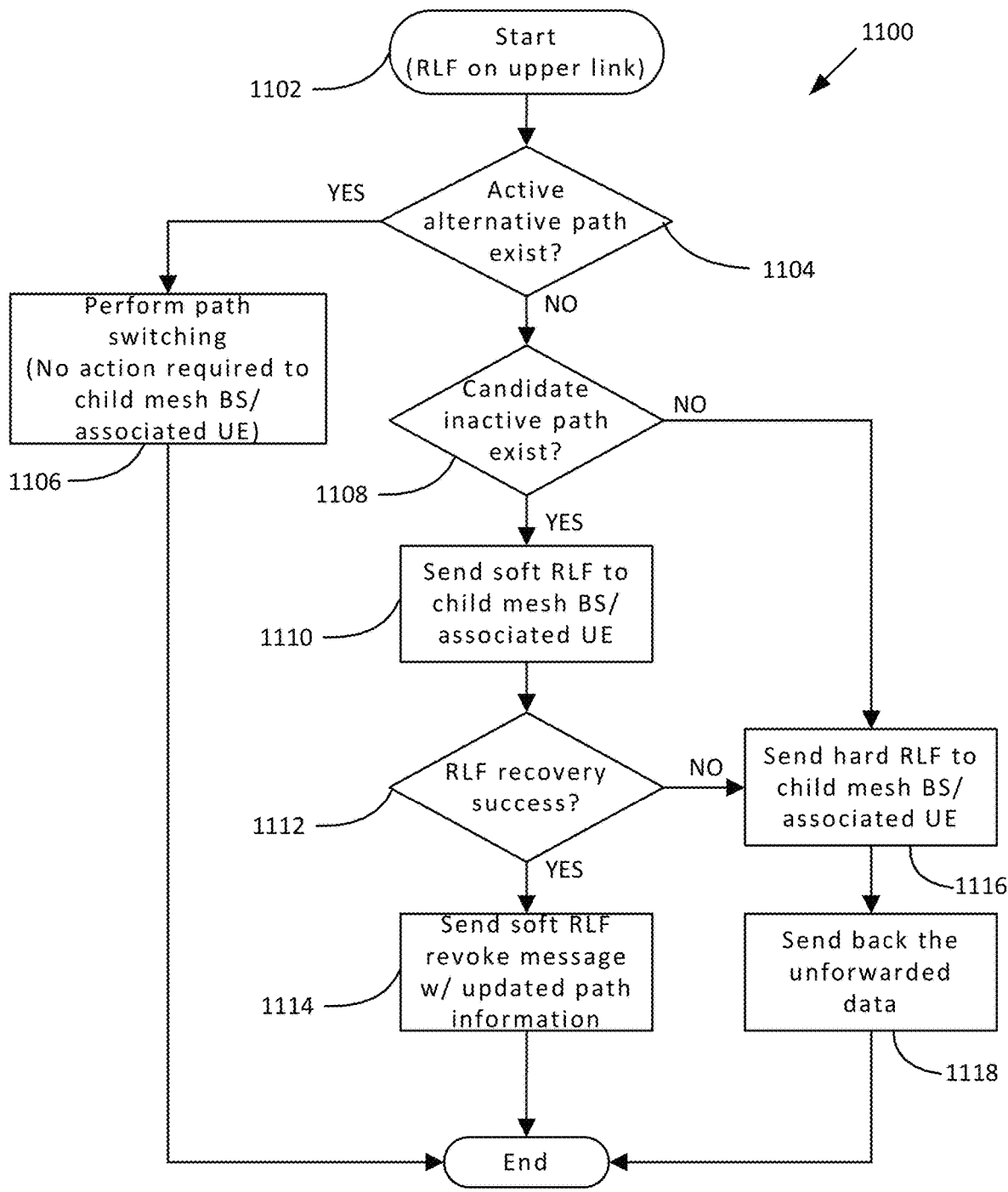
FIG. 11 illustrates a flowchart of a method for RLF handling according to embodiments of the present disclosure.
Figure 12A:
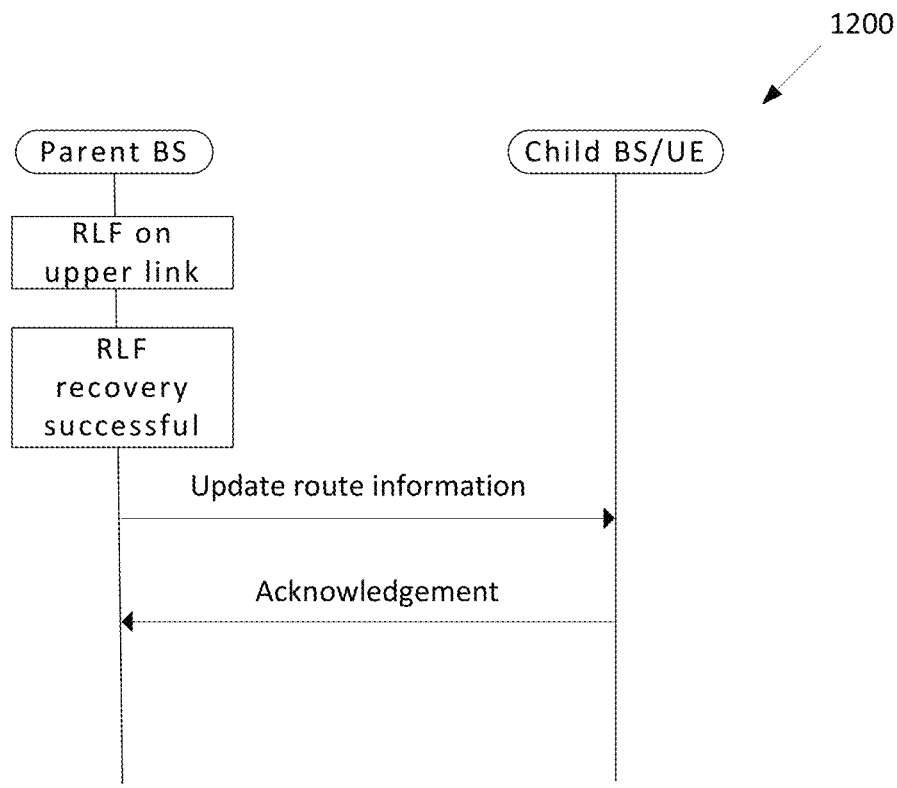
FIG. 12A illustrates a message flow diagram of a method for RLF handling according to embodiments of the present disclosure.
Figure 12B:
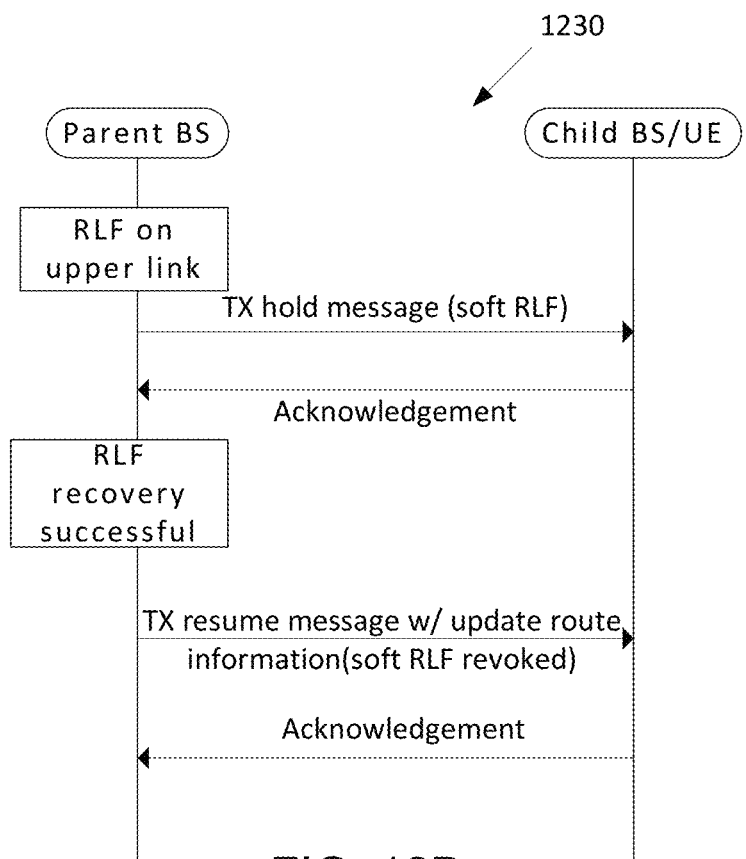
FIG. 12B illustrates another message flow diagram of a method for RLF handling according to embodiments of the present disclosure.
Figure 12C:
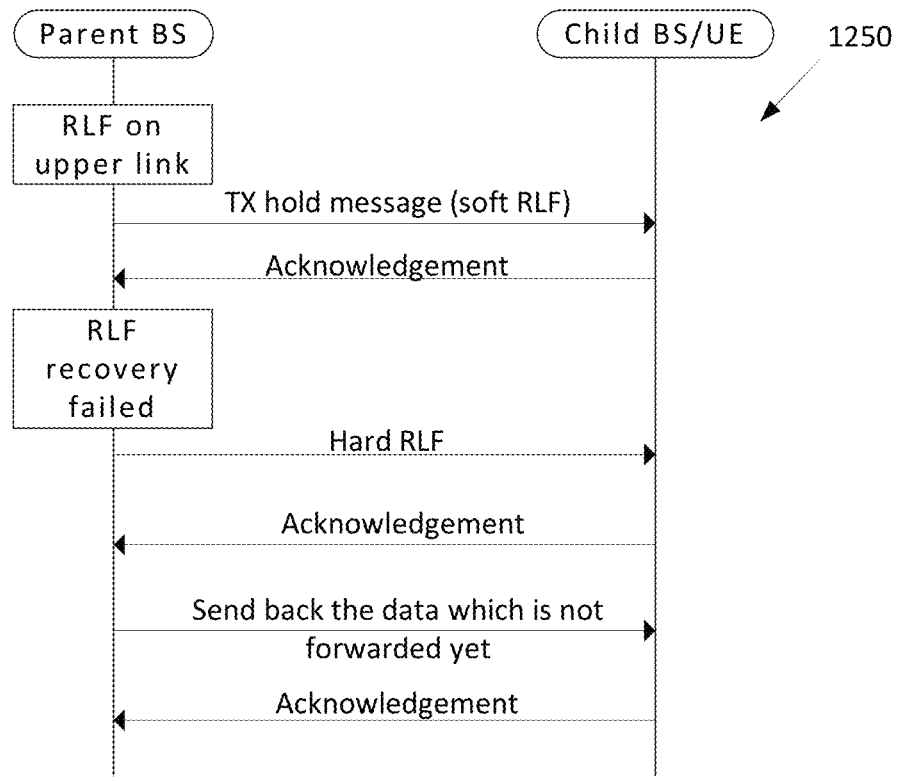
FIG. 12C illustrates yet another message flow diagram of a method for RLF handling according to embodiments of the present disclosure.
Figure 12D:
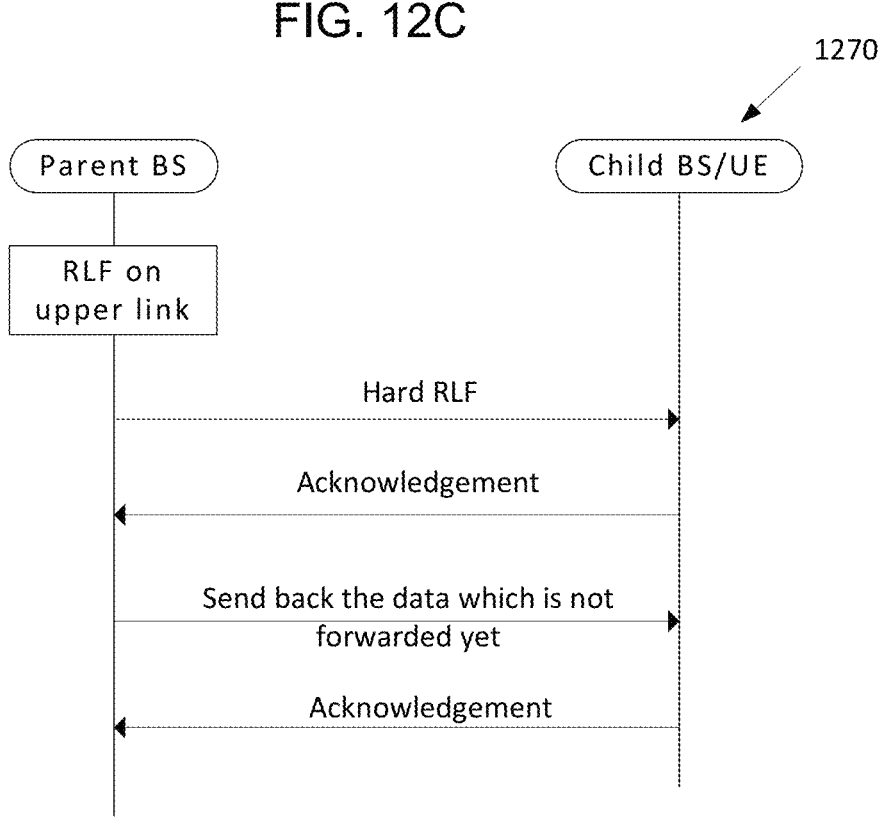
FIG. 12D illustrates yet another message flow diagram of a method for RLF handling according to embodiments of the present disclosure.

FIG. 11 illustrates a flowchart of a method 1100 for RLF handling according to embodiments of the present disclosure, as may be performed by a patent or serving BS (e.g., BS 101-103 and/or any of the BSs in FIG. 9). The embodiment of the method 1100 illustrated in FIG. 11 is for illustration only. FIG. 11 does not limit the scope of the present disclosure to any particular implementation. FIGS. 12A-12D illustrates corresponding a message flow diagrams 1200, 1230, 1250, and 1270, respectively, for RLF handling according to embodiments of the present disclosure. The message flow diagrams 1200, 1230, 1250, and 1270, are performed between a patent or serving BS (e.g., BS 101-103 and/or any of the BSs in FIG. 9) and a child BS (e.g., BS 904) or a UE (e.g., UE 116 or 920). The embodiments of the message flow diagrams 1200, 1230, 1250, and 1270 are for illustration only. FIGS. 12A-12D do not limit the scope of the present disclosure to any particular implementation.

FIG. 11 is an example of the method 1100 in handling the occurrence of RLF from the perspective of a BS which detects RLF on a link towards a gateway BS consistent with embodiments disclosed herein. The method 1100 begins at step 1102 with the occurrence of RLF. At operation 1104, the mesh BS checks if any active alternative path(s) exist. For example, the mesh BS may be currently supporting multi-path routing or dual connectivity. In such cases, the current mesh BS can steer traffic to an alternative path, or equivalently through a different parent BS, to the gateway, which is illustrated in operation 1106. If the route has been altered, updated route related information, e.g., cost metric such as hop counts, the BS can send such updated route information to the connected child mesh BS(s) and/or UE(s). This procedure is also illustrated in message flow diagram 1200. As illustrated, the parent BS RLF recovery is successful, updated route information is sent, and the child BS or UE acknowledges the updated route information message.

If no active alternative path exists, the current mesh BS checks if any candidate inactive path exists at operation 1108. The current mesh BS can be a set of BSs discovered during neighboring cell measurement procedure but possibly those currently having no active connection with. In this case, establishing a new connection with one of already discovered BSs may take longer time and be less certain than switching amongst active paths as the new connection establishment involves, e.g., random access procedure and RRC connection setup. Thus, in this embodiment, while that the current mesh BS attempts to establish a new path, to limit or avoid buffer overflow, at operation 1110, the current mesh BS may send a soft RLF (or TX hold) message to child mesh BS(s)/UE(s) in order to inform the occurrence of RLF and to command to cease transmissions. If the RLF recovery is successful at operation 1112, the current mesh BS sends soft RLF revoke message with the updated path information to child mesh BS(s)/UE(s) of the current mesh BS in operation 1114. This procedure is also illustrated in message flow diagram 1230. As illustrated, the parent BS sends the soft RLF (which is acknowledged the UE or child BS), recovers from the RLF (e.g., by switching to the inactive connection or recovering the original link on which the RLF occurred), revokes the soft RLF (sends a TX resume message, which may include updated route information), which is acknowledged by the UE or child BS.

In some embodiments, the RLF recovery could have failed with one or more of the candidate inactive paths at operation 1112. In this case the current mesh BS may need to begin cell searching until the current mesh BS finds a candidate mesh BS to perform initial access. Such process may involve longer delay compared to the aforementioned examples and it may be beneficial to inform the associated mesh BS(s)/UE(s) such that the associated mesh BS(s)/UE(s) can try to establish a new path. In other embodiments, no candidate paths may exist at operation 1108 and the BS informs the associated mesh BS(s)/UE(s) to try to establish a new path.

In various embodiments, the indication for the associated mesh BS(s)/UE(s) to try to establish a new path can be done by sending a hard RLF notification at operation 1116. In another embodiment, the decision to transmit the hard RLF can be triggered by a time-out event of a clock. In one embodiment, along with sending the hard RLF notification, at operation 1118, the current mesh BS may also send back the data that the current mesh BS has received from child mesh BS(s)/UE(s) of the current mesh BS but not forwarded yet due to the RLF. This is because the child mesh BS(s)/UE(s) may have removed that data from their buffer upon receiving the reception acknowledgement from the current mesh BS, which can no longer forward the data in a timely manner.

An example of this procedure is also illustrated in message flow diagram 1250. As illustrated, the parent BS, after failure of the RLF (e.g., on the parent's current link, with candidate alternative paths, by virtue of time-out event, and/or absence of candidate alternative paths), the parent BS sends a hard RLF and sends back unforwarded data to the child BS or UE, each of which are acknowledged by the child BS or UE.

Another example, of this procedure is also illustrated in message flow diagram 1270. In various embodiments, the current mesh BS has neither active alternative path nor candidate inactive path upon the occurrence of RLF. In that case, the current mesh BS may directly proceed to send a hard RLF and send back unforwarded data (i.e., without sending a soft RLF notification message) to the child BS or UE, each of which are acknowledged by the child BS or UE.

In one embodiment, the parent BS may receive a notification from a child mesh BS informing of establishment of an alternate path (e.g., as discussed in greater detail with regard to FIGS. 13 and 14 below), the current parent BS may configure itself to become the child of this BS, e.g., in order to connect to a gateway BS through the child mesh BS.

In another embodiment, a mesh BS transmits a soft RLF message to child BSs upon detection of an RLF to a parent BS. Similarly, any mesh BS receiving a soft RLF message from a parent BS may also forward the soft RLF to the child BSs of the mesh BS. However, the transmission of hard RLF may be implicit and decided independently at each BS, for example, based on the expiry of a timer since the reception of the soft RLF.

Figure 13:
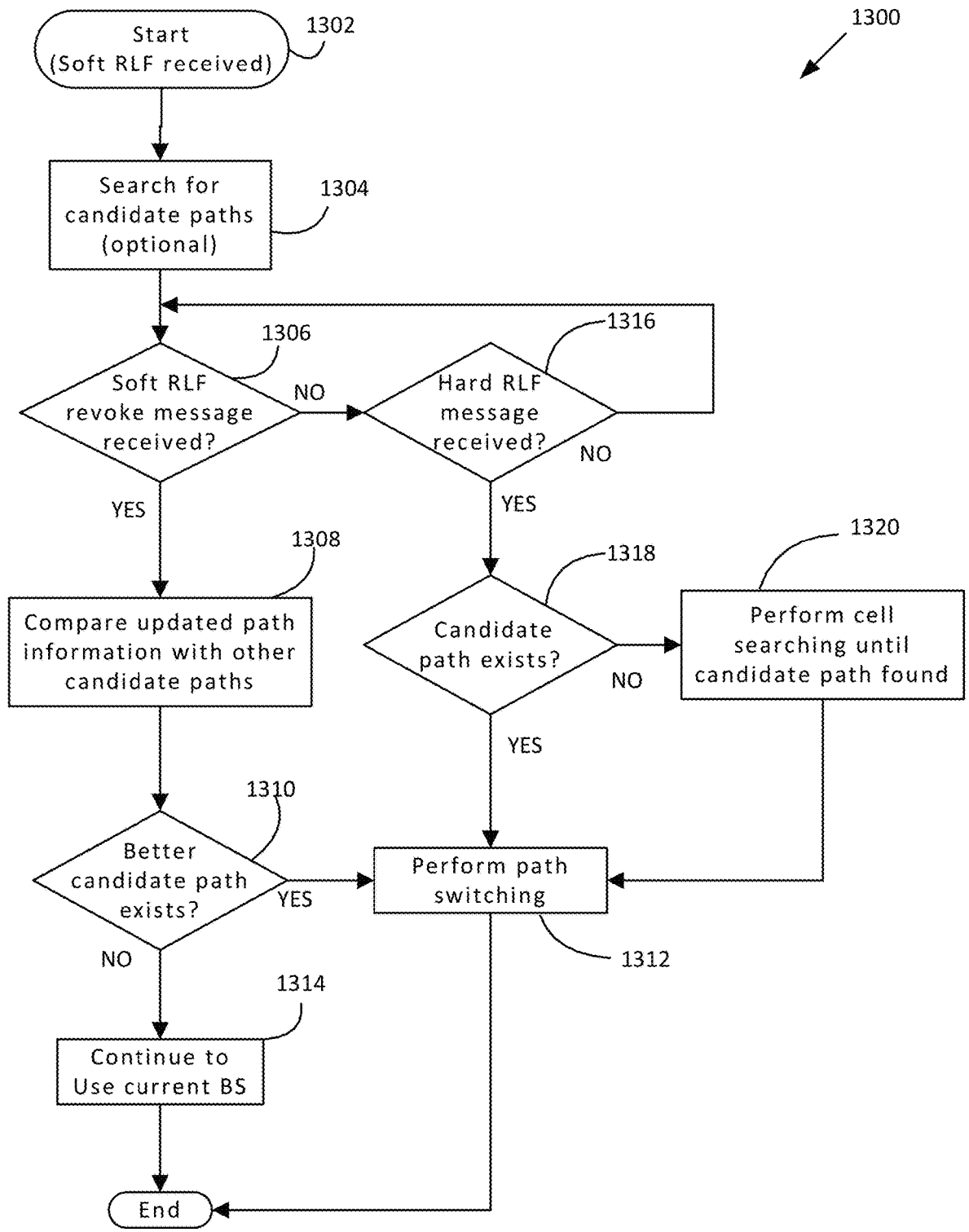
FIG. 13 illustrates a flowchart of a method for RLF handling with a soft RLF message according to embodiments of the present disclosure.

FIG. 13 illustrates a flowchart of a method 1300 for RLF handling with a soft RLF message according to embodiments of the present disclosure. For example, the method 1300 may be performed by a child BS (e.g., BS 904) or a UE (e.g., UE 116 or 920). The embodiment of the method 1300 illustrated in FIG. 13 is for illustration only. FIG. 13 does not limit the scope of the present disclosure to any particular implementation.

FIG. 13 is an example of a method 1300 in handling the occurrence of RLF from the perspective of a child mesh BS/UE which may have received a soft RLF message from a parent mesh BS consistent with embodiments disclosed herein. As illustrated in FIG. 13, the method 1300 begins at step 1302. Upon receiving the soft RLF message, at operation 1304, the current mesh BS/UE may forward the soft RLF/TX hold message to one or more of the child BSs and UEs and may start searching for candidate alternate paths. If the mesh BS/UE maintains already a list of candidate paths through neighboring cell measurement or, if the mesh BS/UE decides to wait for the parent mesh BS's further confirmation with hard RLF notifications before the mesh BS/UE takes any action, the mesh BS/UE may skip operation 1304.

If the soft RLF revoke message is received from the parent mesh BS at operation 1306, the current mesh BS/UE obtains the updated path information from the soft RLF revoke message or a message transmitted with the soft RLF revoke. Then the current mesh BS/UE compares the updated path information with potential possible alternative paths, if the potential possible alternative paths exist, at operation 1308.

At operation 1310, if it is evaluated such that there exists a better alternative path than what the parent mesh BS has established, then the current mesh BS/UE can decide to perform path switching at operation 1312, for example, if path metrics for the new path exceed those for the current path by a threshold. At operation 1306, if a soft RLF revoke message is not received but a hard RLF message is received at operation 1316, then the current mesh BS/UE checks if any candidate path, either active or inactive, exists at operation 1318 and performs path switching at operation 1312. If no hard RLF message received at operation 1316, the current mesh BS/UE continues to look for an RLF revoke or hard RLF while proceeding with remediation actions.

If no candidate path exists currently, then the mesh BS/UE may to proceed to operation 1320 to perform cell searching until a candidate path is found. In one embodiment, if a current mesh BS has not received a soft RLF revoke or a hard RLF message within a time gap T since the soft RLF/TX hold message, the current mesh BS may automatically consider that a hard RLF situation occurs.

The time gap T may be either a constant value or variable value (e.g., depending on hop count to parent BS with RLF or can be randomly assigned) to prevent a sudden influx of radio resource connection (RRC) connection establishment requests in the network. Additionally, or alternatively, the mesh BS/UE may also transmit a packet to a current parent to determine if an RLF of the link to the current parent has occurred. Upon detection of an alternate path, the mesh BS/UE may also send a packet to inform a current parent (from whom hard RLF was received or time-out occurred) as well as one or more child mesh BS s and UEs about re-establishment of a path via an RLF revoke message or an alternate TX resume message.

Figure 14:
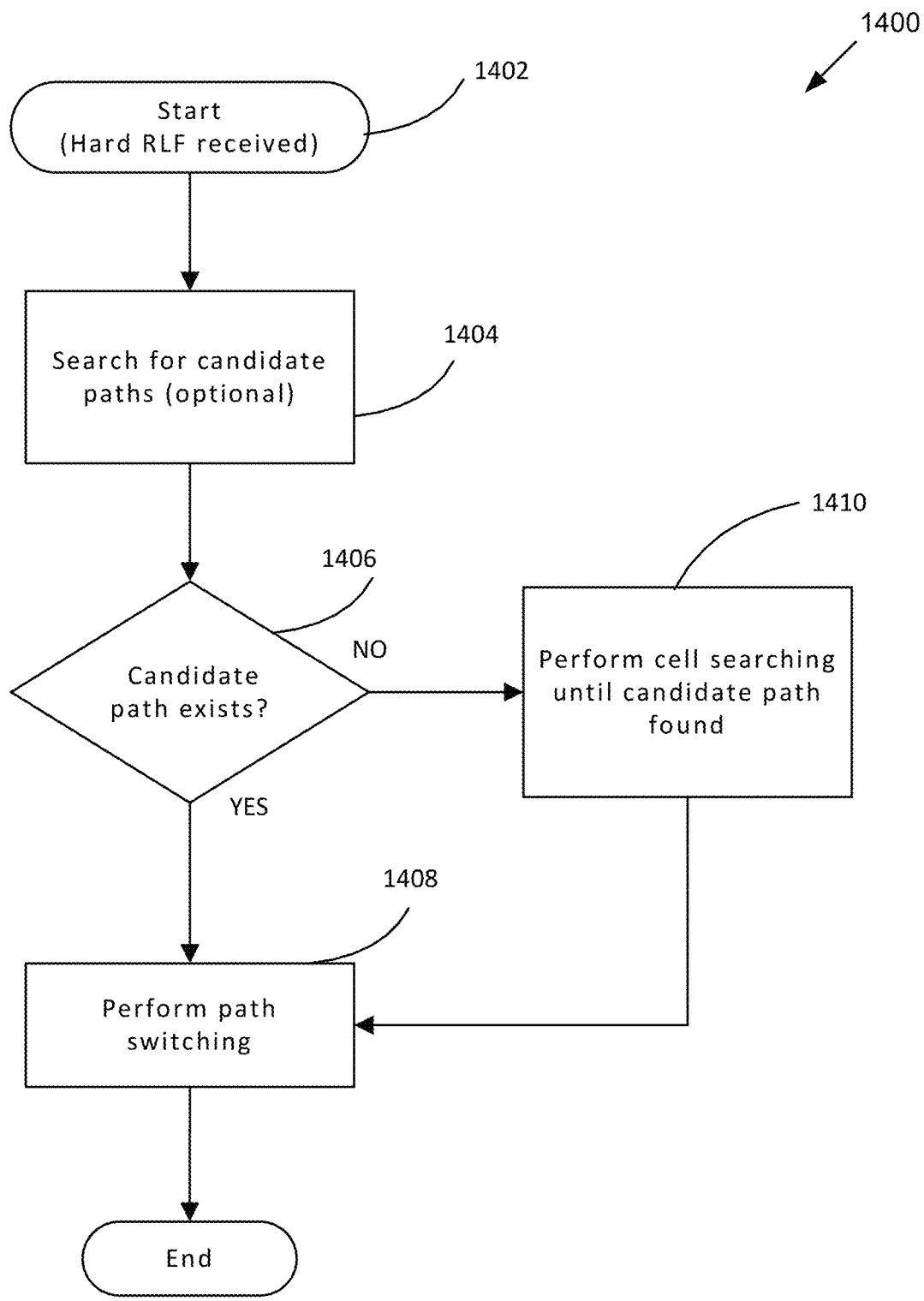
FIG. 14 illustrates a flowchart of a method for RLF handling with a hard RLF message according to embodiments of the present disclosure.

FIG. 14 illustrates a flowchart of a method 1400 for RLF handling with a hard RLF message according to embodiments of the present disclosure. For example, the method 1400 may be performed by a child BS (e.g., BS 904) or a UE (e.g., UE 116 or 920). The embodiment of the method 1400 illustrated in FIG. 14 is for illustration only. FIG. 14 does not limit the scope of the present disclosure to any particular implementation.

FIG. 14 is an example of a method 1400 in handling the occurrence of RLF from the perspective of a mesh BS/UE which received a hard RLF message from a parent mesh BS consistent with embodiments disclosed herein. As discussed above with regard to FIG. 11, it is possible that a mesh BS/UE can receive the hard RLF message from the parent mesh BS (operation 1402) without a preceding soft RLF message. In such a case, a mesh BS/UE can start searching for candidate paths at operation 1404 upon receiving the hard RLF message.

If the mesh BS/UE maintains already a list of candidate paths, the mesh BS/UE may skip operation 1404 and proceed to operation 1406, and performs path switching at operation 1408. If currently no candidate path exists, then the mesh BS/UE may need to proceed to operation 1410 to perform cell searching until a candidate path is found. Upon detection of an alternate path, the mesh BS/UE may also send a packet to inform a current parent (from whom a hard RLF message has been received) as well as one or more child mesh BSs and UEs about re-establishment of a path via an RLF revoke message or an alternate TX resume message.

Figure 15:
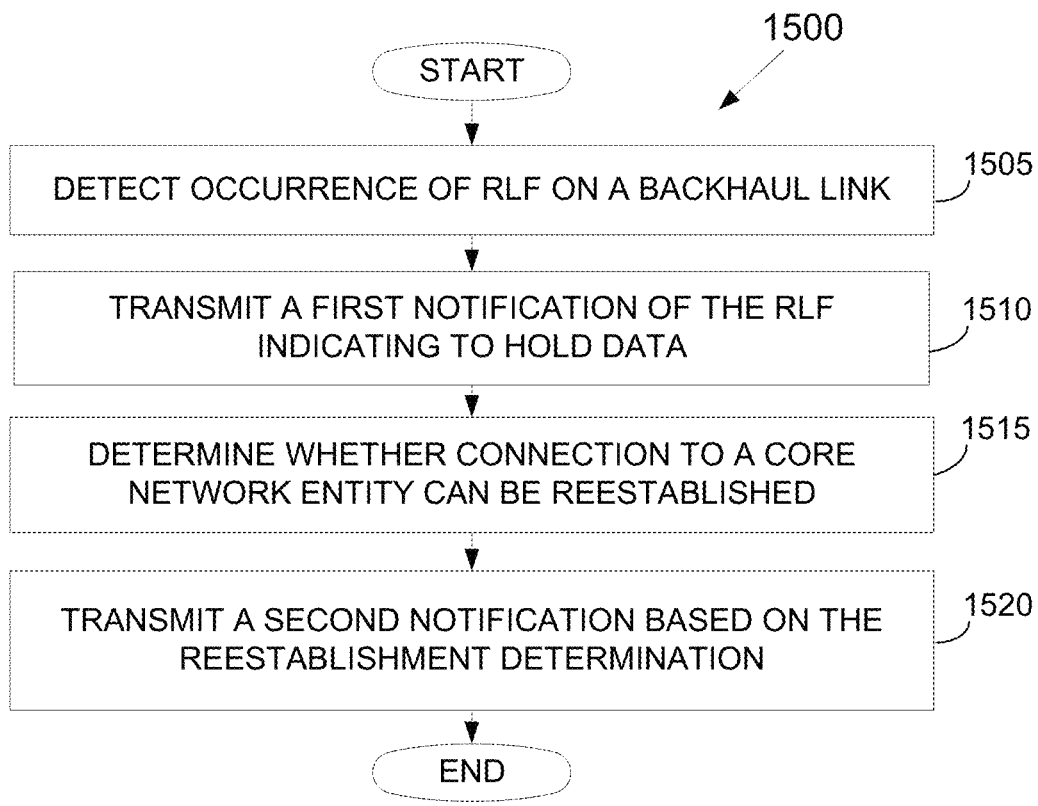
FIG. 15 illustrates an example of a method for RLF handling by a parent BS in a wireless mesh network according to embodiments of the present disclosure.

FIG. 15 illustrates a flowchart of a method 1500 for RLF handling by a parent BS in a wireless mesh network according to embodiments of the present disclosure, may be performed by a base station (e.g. 101-103 as illustrated in FIG. 1 and/or any of the BSs in FIG. 9). The embodiment of the method 1500 illustrated in FIG. 15 is for illustration only. FIG. 15 does not limit the scope of the present disclosure to any particular implementation.

The method begins with the BS detecting occurrence of RLF on a backhaul link (operation 1505). For example, in operation 1505, the RLF may occur on a link of a parent BS of the BS in the mesh wireless network.

The BS then transmits a first notification of the RLF indicating to hold data (operation 1510). For example, in operation 1510, the first notification may be a TX hold or soft RLF notification message and is sent to a connected child BS(s) and/or UE(s) to request holding of data to be transmitted to the BS to manage buffer overflow while the BS attempts to remedy the RLF. In embodiments where the BS supports dual connectivity and/or alternative routes via other parent BS(s), the BS determines, after detection of the RLF, whether to send the first notification to the child BS(s) and/or UE(s) based on a status of the connection to the other BS(s), e.g., such as whether the connection to the other BS is currently active. If the BS determines that the status of the connection to the other BS is that the BS is not presently connected but can reconnect to the other BS (e.g., inactive), the BS determines to send the first notification to the child BS(s) and/or UE(s) based on the BS not being presently connected but capable of reconnection to the other BS (e.g., inactive). If, however, the connection status is active, the BS may determine not to send the soft RLF but may rather send updated route information.

The BS then determines whether connection to a core network entity (e.g., core network 910) can be reestablished (operation 1515). For example, in operation 1515, after detecting the occurrence of the RLF with the parent BS, the BS may search for and attempt to connect to other parent BS(s) in the wireless communication network and/or attempt to reestablish connection with the current parent BS for which the RLF occurred. If neither is successful, the BS may determine to send a hard RLF indicating that the connection to the core network entity cannot be reestablished.

The BS then transmits a second notification based on the reestablishment determination (operation 1520). For example, in operation 1520, if the reestablishment determination is that the BS cannot reestablish connection to the core network entity, the second notification includes an indication that the BS cannot reestablish connection to the core network entity (e.g., a hard RLF notification message) and the BS transmits, to the child BS(s) and/or UE(s), data that had been received from the child BS(s) and/or UE(s) but not yet been forwarded to the parent BS of the BS. If, however, the reestablishment determination is that the BS can reestablish connection to the core network entity, the second notification may include an indication for the child BS(s) and/or UE(s) to resume transmission of the data that had been held to the BS (e.g., a TX resume notification message) and may also include updated route information (e.g., if the BS reestablishes connection to the core network entity via an alternate route).

Figure 16:
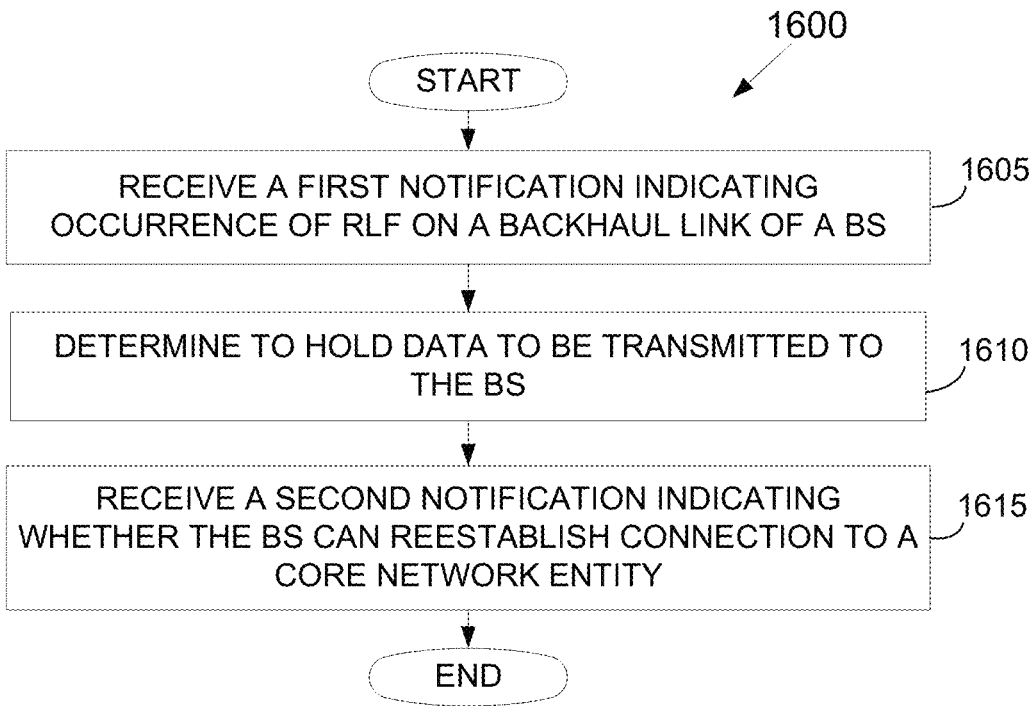
FIG. 16 illustrates an example of a method for RLF handling by a child BS or a UE in a wireless mesh network according to embodiments of the present disclosure.

FIG. 16 illustrates an example of a method 1600 for RLF handling by a child BS or a UE in a wireless mesh network according to embodiments of the present disclosure. The method 1600 may be performed by wireless communication device, such as, a child BS (e.g., BS 904) or a UE (e.g., UE 116 or 920). The embodiment of the method 1600 illustrated in FIG. 16 is for illustration only. FIG. 16 does not limit the scope of the present disclosure to any particular implementation.

The method begins with the wireless communication device receiving a first notification indicating occurrence of RLF on a backhaul link of a BS (operation 1605). For example, in operation 1605, the first notification may be a soft RLF or TX hold notification message received from a parent or serving BS indicating an RLF with its parent BS in the mesh wireless network. The wireless communication device then determines to hold data to be transmitted to the BS (operation 1610). For example, in operation 1610, the wireless communication device holds data intended to be transmitted to the BS based on receipt of the first notification. In some embodiments, the wireless communication device may search (or identify from a maintained list), in response to receiving the first notification, for other BS(s) to connect to. If found, the wireless communication device may connect to the other BS, for example, after receiving a hard RLF or in the absence of receiving a hard RLF (i.e., waiting for a hard RLF or TX resume) may determine switch connection from the current parent/serving BS to the other BS.

Thereafter, the wireless communication device receives a second notification indicating whether the BS can reestablish connection to a core network entity (operation 1615). For example, in operation 1615, the second notification may indicate that the BS cannot reestablish connection to the core network entity (e.g., a hard RLF notification message). The wireless communication device may then receive, from the BS, data that the wireless communication device had transmitted to the BS but had not yet been forwarded to the parent BS of the BS. In another example, the second notification indicates that the BS can reestablish connection to the core network entity (e.g., a TX resume notification message) and for the wireless communication device to resume transmission of the data that had been held to the BS. the second notification includes updated route information. In some embodiments, after receiving a hard RLF at operation 1615, the wireless communication device may search for other parent/serving BS s to connect to; and connect, after identification of the other BS, to the other BS.

The above flowcharts and flow diagrams illustrate examples of methods and processes that can be implemented in accordance with the principles of the present disclosure and various changes could be made to the methods and processes illustrated in the flowcharts and flow diagrams. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims.

What is claimed is:

1. A base station (BS) in a wireless communication network, the BS comprising:
   a processor configured to:
      detect occurrence of a radio link failure (RLF) on a backhaul link with a parent BS of the BS; and
   a transceiver operably connected to the processor, the transceiver configured to transmit, to a wireless communication device connected to the BS:
      a first notification indicating for the wireless communication device to hold data to be transmitted from the wireless communication device to the BS;
      in response to reestablishment of the connection to a core network entity, a second notification indicating for the wireless communication device to resume transmitting data via a first alternate communication path; and
      in response to failing to reestablish the connection to the core network entity, a third notification indicating for the wireless communication device to establish a second alternate communication path to the core network entity,
   wherein the second notification comprises updated route information for the first alternate communication path, and wherein the transceiver is configured to transmit the third notification along with data that has been received from the wireless communication device if the BS determines that RLF is unrecoverable.

2. The BS of claim 1, wherein:
when the BS cannot reestablish connection to the core network entity, the third notification includes an indication that the BS cannot reestablish connection to the core network entity, and
the transceiver is configured to transmit, to the wireless communication device, data that had been received from the wireless communication device but not yet been forwarded to the parent BS of the BS.

3. The BS of claim 1, wherein the processor is configured to send the third notification in response to an expiration of a timer after sending the first notification.

4. The BS of claim 1, wherein the second notification is transmitted in response to the processor determining that another communication path is available and the third notification is also transmitted in response to a determination that the another communication path is not available.

5. The BS of claim 4, wherein the another communication path comprises a first set of alternative paths and corresponding first hop BSs through which traffic can be steered without incurring connection reestablishment delay and a second set of alternative paths and corresponding first hop BSs through which the traffic can be steered requiring connection establishment, and
wherein the wireless communication device begins cell searching until finding a candidate mesh BS to perform initial access if the another communication path does not exist in the first set and the second set of alternative paths and corresponding first hop BSs.

6. The BS of claim 1, wherein:
the wireless communication device connected to the BS is a child BS of the BS or a user equipment (UE), and
one of the first notification or the third notification includes updated route information.

7. The BS of claim 1, wherein the updated route information includes a route cost metric comprising a number of hop counts towards the parent BS.

8. The BS of claim 1, wherein the wireless communication device, upon receiving the first notification, forwards the first notification to another wireless communication device.

9. The BS of claim 1, wherein:
the transmission of the second notification to the wireless communication device is implicit upon expiration of a timer after transmitting the first notification, and
the timer is a constant value, variable value depending on hop count to the parent BS, or a random value.

10. A wireless communication device in a wireless communication network, the wireless communication device comprising:
a transceiver configured to receive, from a base station (BS), a first notification indicating occurrence of a radio link failure (RLF) on a backhaul link of the BS with a parent BS of the BS; and
a processor operably connected to the transceiver, the processor configured to determine, based on the first notification, to hold data to be transmitted by the wireless communication device to the BS,
wherein the transceiver is further configured to receive a second notification when the BS can reestablish connection to a core network entity in the wireless communication network,
wherein the processor is configured to determine, based on the second notification, a first alternate communication path to resume transmitting data by the wireless communication device to the BS,
wherein the transceiver is further configured to receive a third notification when the BS cannot reestablish the connection to the core network entity in the wireless communication network,
wherein the processor is configured to determine, based on the third notification, to establish a second alternate communication path to the core network entity,
wherein the second notification comprises updated route information for the first alternate communication path, and
wherein in response to receiving the third notification, the transceiver is configured to receive, from the BS, data that the wireless communication device had transmitted to the BS but had not yet been forwarded to the parent BS of the BS.

11. The wireless communication device of claim 10, wherein:
in response to receiving the first notification, the transceiver is configured to cease a configured grant transmission.

12. The wireless communication device of claim 10, wherein the processor is configured to:
only cease data transmission not including control message transmission based on receipt of the first notification.

13. The wireless communication device of claim 10, wherein the processor is configured to:
receive the third notification before or after the first notification.

14. The wireless communication device of claim 10, wherein the processor is configured to:
receive the third notification after an expiration of a timer upon receiving the first notification.

15. The wireless communication device of claim 14, wherein the processor is configured to perform cell searching to find a candidate mesh BS to perform initial access if an alternative communication path does not exist.

16. The wireless communication device of claim 10, wherein:
the wireless communication device is a child BS of the BS, or a user equipment (UE), and
the second notification includes updated route information.

17. The wireless communication device of claim 16, wherein in response to receiving the second notification along with the updated route information, the wireless communication device determines to one of:
maintain a route through the BS, or
initiate path switching by comparing the updated route information with potential possible alternative paths.

18. The wireless communication device of claim 10, wherein the processor is configured to receive the third notification along with the data that has been previously transmitted to the BS.

19. The wireless communication device of claim 10, wherein the processor, upon receiving the first notification, forwards the first notification to another wireless communication device.

20. A method for operating a base station (BS) in a wireless communication network, the method comprising:
detecting occurrence of a radio link failure (RLF) on a backhaul link with a parent BS of the BS;

transmitting, to a wireless communication device connected to the BS:
   a first notification indicating for the wireless communication device to hold data to be transmitted from the wireless communication device to the BS;
   in response to reestablishment of the connection to a core network entity, a second notification indicating for the wireless communication device to resume transmitting data via a first alternate communication path;
   in response to failing to reestablish the connection to the core network entity, a third notification indicating for the wireless communication device to establish a second alternate communication path to the core network entity; and
   in response to determining that the RLF is unrecoverable, data that had been received from the wireless communication device but not yet been forwarded to the parent BS of the BS,
wherein the second notification comprises updated route information for the first alternate communication path.

21. The method of claim 20, wherein when the BS cannot reestablish connection to the core network entity, the third notification includes an indication that the BS cannot reestablish connection to the core network entity.

22. The method of claim 20, wherein the second notification includes an indication for the wireless communication device to resume transmission of the data that had been held to the BS.

23. The method of claim 20, further comprising determining whether the connection to the core network entity is available via another communication path by:
   after detecting the occurrence of the RLF with the parent BS:
     identifying an active alternative path; or
     identifying an inactive alternative path comprising a connection via another parent BS in the wireless communication network, and
   transmitting the third notification comprises transmitting the third notification indicating that the connection to the core network entity cannot be reestablished after determining that neither the active alternative path nor the inactive alternative path exists.

24. The method of claim 20, further comprising:
connecting to another BS; and
determining, after detection of the RLF, whether to send the first notification to the wireless communication device based on a status of the connection to the other BS.

25. The method of claim 24, further comprising:
determining that the status of the connection to the other BS is that the BS is not presently connected but can reconnect to the other BS; and
generating the first notification based on the BS not being presently connected but capable of reconnection to the other BS.

* * * * *